(12) United States Patent
Kraus et al.

(10) Patent No.: US 11,167,436 B2
(45) Date of Patent: Nov. 9, 2021

(54) ELECTRIC APPLIANCE FOR PERSONAL CARE

(71) Applicant: Braun GmbH, Kronberg (DE)

(72) Inventors: Bernhard Kraus, Braunfels (DE); Thomas Verstege, Frankfurt am Main (DE); Uwe Schober, Glashuetten (DE); Frank Ziegler, Karben (DE)

(73) Assignee: Braun GMBH, Kronberg (DE)

( * ) Notice: Subject to any disclaimer, the term of this patent is extended or adjusted under 35 U.S.C. 154(b) by 53 days.

(21) Appl. No.: 15/950,627

(22) Filed: Apr. 11, 2018

(65) Prior Publication Data

US 2018/0319028 A1 Nov. 8, 2018

(30) Foreign Application Priority Data

Apr. 27, 2017 (EP) ..................................... 17168469

(51) Int. Cl.
*B26B 19/28* (2006.01)
*B26B 19/38* (2006.01)
(Continued)

(52) U.S. Cl.
CPC ............ *B26B 19/28* (2013.01); *B26B 19/386* (2013.01); *H02K 11/0141* (2020.08);
(Continued)

(58) Field of Classification Search
CPC ..... B26B 19/28; B26B 19/282; B26B 19/284; B26B 19/38; G06F 1/182; H05K 9/00;
(Continued)

(56) References Cited

U.S. PATENT DOCUMENTS 3,268,786 A 8/1966 Reich
3,749,951 A 7/1973 Artin et al.
(Continued)

FOREIGN PATENT DOCUMENTS

DE 10242094 A1 4/2004
EP 674979 B1 11/1997
(Continued)

OTHER PUBLICATIONS https://www.stainless-steel-world.net/basicfacts/stainless-steel-and-its-families.html. Accessed Sep. 26, 2019 (Year: 2019).*
(Continued)

*Primary Examiner* — Burton S Mullins
(74) *Attorney, Agent, or Firm* — Kevin C. Johnson; Gerd Zetterer

(57) ABSTRACT

The present invention relates to electric appliances for personal care, in particular electric shavers, comprising a drive unit having first and second drive components adapted to magnetically interact with each other, and a magnetic shielding at least partially surrounding the drive unit. Said magnetic shielding is formed by structural parts supporting the drive unit and/or transmitting drive movements of the drive unit, wherein such structural parts are made of a soft magnetic material. More particularly, a mounting frame and a transmitter frame together form a magnetic shielding cage which is movable as the mounting frame and the transmitter frame are movable relative to each other.

17 Claims, 5 Drawing Sheets

(51) Int. Cl.
  *H02K 33/16* (2006.01)
  *H02K 5/02* (2006.01)
  *H02K 7/14* (2006.01)
  *H02K 11/01* (2016.01)

(52) U.S. Cl.
  CPC ............ *H02K 33/16* (2013.01); *B26B 19/282* (2013.01); *H02K 5/02* (2013.01); *H02K 7/145* (2013.01)

(58) Field of Classification Search
  CPC .. H02K 5/00; H02K 5/02; H02K 5/24; H02K 2211/00
  USPC .......................................................... 310/28
  See application file for complete search history.

(56) References Cited

U.S. PATENT DOCUMENTS

| | | | |
|---|---|---|---|
| 3,800,172 | A | 3/1974 | Artin et al. |
| 4,156,882 | A * | 5/1979 | Delagi ................. G11B 5/10 360/125.33 |
| 4,240,200 | A | 12/1980 | Bukoschek |
| 5,559,378 | A | 9/1996 | Oudet et al. |
| 5,632,087 | A | 5/1997 | Motohashi et al. |
| 7,053,507 | B2 | 5/2006 | Kobayashi et al. |
| 7,304,407 | B2 | 12/2007 | Sanematsu et al. |
| 7,334,338 | B2 * | 2/2008 | Shiba ................. B26B 19/04 30/346.51 |
| 7,841,090 | B2 | 11/2010 | Eichhorn et al. |
| 8,373,315 | B2 | 2/2013 | Kobayashi et al. |
| 8,464,429 | B2 * | 6/2013 | Haczek ................. A45D 26/00 30/32 |
| 8,731,186 | B1 | 5/2014 | Hadad |
| 8,806,756 | B2 * | 8/2014 | Kraus ................. B26B 19/288 30/43.3 |
| 9,127,366 | B2 * | 9/2015 | Matsuda ................. C09D 5/08 |
| 9,768,675 | B2 | 9/2017 | Andrikowich et al. |
| 10,242,094 | B2 | 3/2019 | True |
| 2002/0134484 | A1 | 9/2002 | Erb, Jr. |
| 2002/0175239 | A1 | 11/2002 | Momoi et al. |
| 2007/0035860 | A1 | 2/2007 | Adachi et al. |
| 2007/0137043 | A1 | 6/2007 | Kraus et al. |
| 2008/0130169 | A1 * | 6/2008 | Kitamura ............... H02K 11/01 360/99.08 |
| 2009/0025229 | A1 | 1/2009 | Kappes et al. |
| 2009/0165305 | A1 | 7/2009 | Kraus et al. |
| 2009/0211101 | A1 | 8/2009 | Azar et al. |
| 2012/0074796 | A1 | 3/2012 | Kobayashi et al. |
| 2012/0125699 | A1 | 5/2012 | Guthrie |
| 2014/0054980 | A1 | 2/2014 | Andrikowich et al. |
| 2015/0097322 | A1 | 4/2015 | Rarey et al. |
| 2015/0145187 | A1 | 5/2015 | Soles et al. |
| 2015/0249893 | A1 * | 9/2015 | Broberg .............. H01M 2/0222 381/323 |
| 2016/0120330 | A1 | 5/2016 | Defranks et al. |
| 2016/0176059 | A1 * | 6/2016 | Ring ..................... B26B 19/282 310/38 |
| 2016/0181901 | A1 * | 6/2016 | Kraus .................... B26B 19/282 310/36 |
| 2018/0311841 | A1 | 11/2018 | Kraus et al. |
| 2018/0311842 | A1 | 11/2018 | Kraus et al. |
| 2018/0311843 | A1 | 11/2018 | Kraus et al. |

FOREIGN PATENT DOCUMENTS

| | | |
|---|---|---|
| EP | 1548917 B1 | 5/2010 |
| EP | 2434626 A2 | 3/2012 |
| EP | 3038242 A1 | 6/2016 |
| GB | 2014372 A | 8/1979 |
| JP | S53063158 A | 6/1978 |
| JP | H011085142 A | 7/1989 |
| JP | H02260699 A | 10/1990 |
| JP | H06089008 A | 3/1994 |
| JP | H08323061 A | 12/1996 |
| JP | H09065634 A | 3/1997 |
| JP | H09125201 A | 5/1997 |
| JP | 2000295833 | 10/2000 |
| JP | 2000316267 A | 11/2000 |
| JP | 2001352740 A | 12/2001 |
| JP | 2002199689 A | 7/2002 |
| JP | 2003348813 A | 12/2003 |
| JP | 2005185067 A | 7/2005 |
| JP | 2005198362 A | 7/2005 |
| JP | 2005354879 | 12/2005 |
| JP | 2005537897 A | 12/2005 |
| JP | 2005537899 A | 12/2005 |
| JP | 2007104898 A | 4/2007 |
| JP | 2008001990 A | 1/2008 |
| JP | 2009507585 A | 2/2009 |
| JP | 2009543620 A | 12/2009 |
| JP | 4487650 B2 | 6/2010 |
| JP | S4812089 B2 | 11/2011 |
| JP | 2012070579 A | 4/2012 |
| JP | 2012070596 A | 4/2012 |
| JP | 2018504984 A | 2/2018 |
| JP | H06089008 A | 5/2020 |
| WO | 03103905 A1 | 12/2003 |
| WO | 2005112053 A1 | 11/2005 |
| WO | WO 2008009322 * | 1/2008 ............. B26B 19/28 |
| WO | 2016103120 A1 | 6/2016 |
| WO | 2016103121 A1 | 6/2016 |

OTHER PUBLICATIONS https://en.wikipedia.org/wiki/Mu-metal Accessed Sep. 26, 2019 (Year: 2019).*
European search report dated Oct. 27, 2017.
European Search Opinion and Report; EP Application No. 17168466.5; dated Nov. 3, 2017; European Patent Office.
European Search Opinion and Report; EP Application No. 17168469.9; dated Oct. 27, 2017; European Patent Office.
European Search Opinion and Report; EP Application No. 17168473.1; dated Nov. 9, 2017; European Patent Office.
European Search Opinion and Report; EP Application No. 17168474.9; dated Nov. 8, 2017; European Patent Office.
Written Opinion of the International Searching Authority; International Application No. PCT/IB2018/0052503; dated Nov. 1, 2018; European Patent Office; Munich, Germany.
Written Opinion of the International Searching Authority; International Application No. PCT/IB2018/052502; dated Nov. 1, 2018; European Patent Office; Munich, Germany.
Written Opinion of the International Searching Authority; International Application No. PCT/IB2018/052507; dated Nov. 1, 2018; European Patent Office; Munich, Germany.
Written Opinion of the International Searching Authority; International Application No. PCT/IB2018/052506; dated Nov. 1, 2018; European Patent Office; Munich, Germany.
Kim, John K.; Final Office Action; U.S. Appl. No. 15/950,657; dated Apr. 16, 2020; United States Patent and Trademark Office; Alexandria, Virginia.
Kim, John K.; Office Action; U.S. Appl. No. 15/950,657; dated Jan. 30, 2020; United States Patent and Trademark Office; Alexandria, Virginia.
Dong, Liang; Final Office Action; U.S. Appl. No. 15/950,597; dated May 15, 2020; United States Patent and Trademark Office; Alexandria, Virginia, only pp. 1-11 of final action considered.
Dong, Liang; Office Action; U.S. Appl. No. 15/950,597; dated Dec. 12, 2019; United States Patent and Trademark Office; Alexandria, Virginia.
Kim, John K.; Notice of Allowance; U.S. Appl. No. 15/950,572; dated Mar. 26, 2020; United States Patent and Trademark Office; Alexandria, Virginia.
Kim, John K.; Office Action; U.S. Appl. No. 15/950,572; dated Nov. 27, 2019; United States Patent and Trademark Office; Alexandria, Virginia.
Notice of Reason for Refusal dated Nov. 30, 2020; Japanese Patent Application No. 2019-554892; Japanese Patent Office; Tokyo, Japan.

(56) References Cited

OTHER PUBLICATIONS

Search Report dated Dec. 11, 2020; Japanese Application No. 2019-554596; Japanese Patent Office.
Search Report dated Nov. 13, 2020; Japanese Application No. 2019-554814; Japanese Patent Office.
Search Report dated Nov. 25, 2020; Japanese Application No. 2019-554937; Japanese Patent Office.
Search Report dated Nov. 27, 2020; Japanese Application No. 2019-554892; Japanese Patent Office.

* cited by examiner

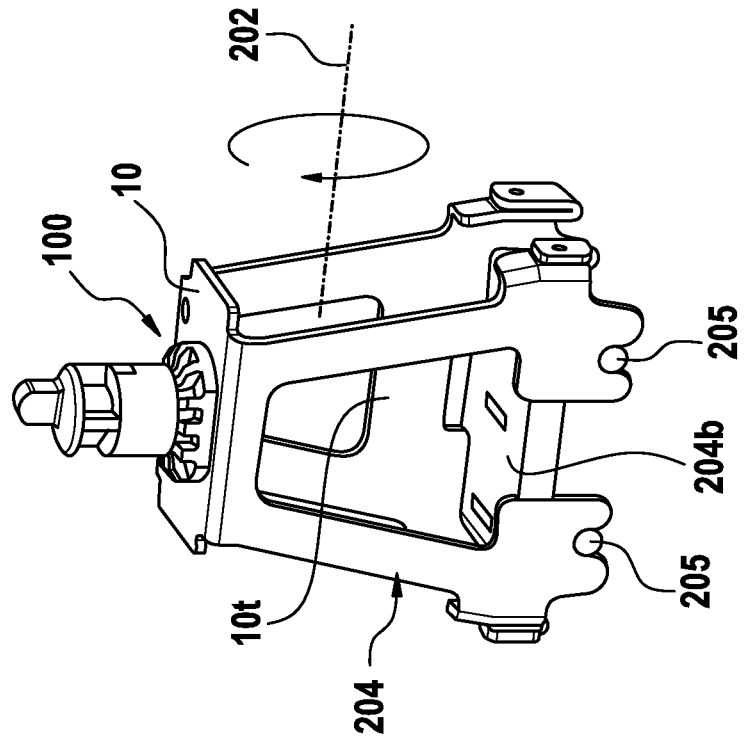
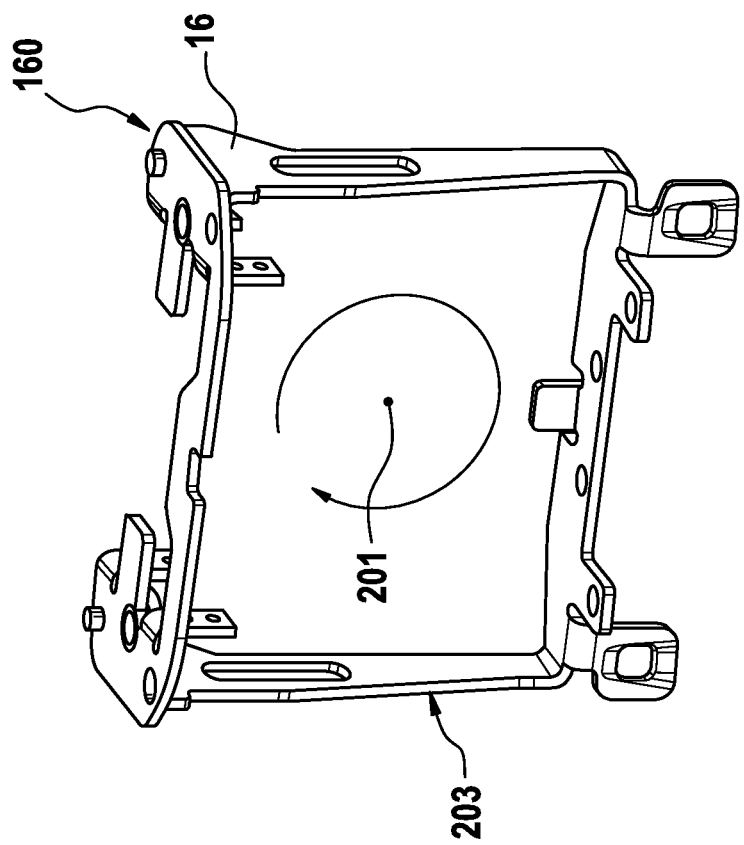
Fig. 5(a)
Fig. 5(b)

ELECTRIC APPLIANCE FOR PERSONAL CARE

FIELD OF THE INVENTION

The present invention relates to electric appliances for personal care, in particular electric shavers, comprising a drive unit having first and second drive components adapted to magnetically interact with each other, a drive train connecting one of said drive components to a working tool to be driven, a drive support for supporting said drive unit relative to a housing and/or a structural part of the electric appliance, and a magnetic shielding at least partially surrounding said drive unit.

BACKGROUND OF THE INVENTION

Small sized electric appliances for personal care often include functional elements or working tools driven by an electric-type, more particularly magnetic-type drive unit which may be received within a housing element that may form a handpiece to be handheld or a tool head connected thereto.

For example, electric shavers may have one or more cutter elements driven by an electric drive unit in an oscillating manner where the cutter elements reciprocate under a shear foil, wherein such cutter elements or undercutters may have an elongated shape and may reciprocate along their longitudinal axis. Other types of electric shavers use rotatory cutter elements which may be driven in an oscillating or a continuous manner. The said electric drive may include an electric or magnetic type linear motor, wherein the drive unit may include an elongated drive transmitter for transmitting the driving motion of the motor to the cutter element.

Such drive systems include sometimes linear-type drive units comprising first and second drive components reciprocating or oscillating relative to each other in a substantially linear manner, i.e. substantially along linear axes, wherein the driving forces may result from magnetic fields. Said drive components usually form the active parts of the linear electric motor and are configured to provide for the driving forces due to magnetic interaction with each other. For example, one of the drive components may include a permanent magnet, whereas another one of the drive components may include one or more magnetic coils to which pulsating electric current is applied to create pulsating magnetic fields, thereby causing the two drive components to oscillate relative to each other. Thus, said drive components are usually different from driven parts of the electric appliance such as the tools to be driven or transmitter parts driven by the linear motor and driving said tools. More particularly, at least one of said drive components may be connected to a tool of the electric appliance such as an undercutter or a shaver or a brush carrier of a toothbrush so as to drive said tool. At least one of the drive components connects to a transmission train transmitting the oscillating movement of the drive component onto the functional element to be driven such as the aforementioned cutter element, wherein such transmission train may include a transmitter pin directly connecting to the cutter element or indirectly connected thereto by means of a yielding bridge structure allowing for pivoting movements of the cutter element.

For example, US 2009/0025229 A1 or U.S. Pat. No. 7,841,090 B2 discloses an electric shaver having a pair of cutter elements provided under a shear foil and driven in an oscillating manner. Furthermore, WO 03/103905 A1 and EP 0 674 979 A1 disclose linear oscillating drive units for shavers, wherein the drive components oscillating relative to each other in a linear manner include a permanent magnet on the one hand and a magnetic coil on the other hand.

In such systems, one of the drive components may be rigidly connected to a mounting structure or the installation environment which is often a handpiece or a tool head formed by a housing part of the electric appliance in which the drive unit is received. For example, the permanent magnet may be rigidly supported or fixedly connected to an interior side of the handpiece via a drive carrier or a mounting structure connected thereto, whereas the other drive component including the magnetic coils may be movably supported on said drive carrier for allowing the linear oscillation, for example by means of a plastic spring device including leaf springs or c-shaped springs as shown by EP 15 48 917 B1.

Furthermore, WO 03/103905 A1 suggests to not fix one of the drive components, but to fix the linkage or pendulum bars linking the two drive components to each other, to the drive carrier and thus, to the installation environment in terms of an inner portion of the handpiece housing. When a first drive component moves to the left, the other drive component moves to the right, and vice versa.

EP 3 038 242 A1 suggests a linear motor for a shaver with two separate spring devices, wherein a first spring device forms a resonance spring connecting the two drive components of the drive unit to each other and a second spring device forms a suspension spring connecting the drive unit to a mounting structure fixed to the shaver's housing forming the handle thereof. Due to such second spring device, the entire drive unit may move relative to the shaver's handle, thereby reducing transmission of vibrations onto the handle.

As the drive components of the drive unit magnetically interact with each other, magnetic fields may propagate beyond the appliance's housing and may have undesired effects onto the ambience. For example, such magnetic fields may interfere with other electrical appliances or even worse, may detrimentally affect the user, in particular when an appliance such as a shaver is held very close to the user's head or personal devices such as a pacemaker. In order to reduce propagation of such magnetic fields, a magnetic shielding such as metal plates attached to the housing may be provided to at least partially surround the drive unit.

However, in personal care appliances that need a very compact design such as electric shavers or toothbrushes, it is rather difficult to accommodate such metal plates inside the housing without enlarging the size thereof. This is even more true, when the drive support and the drive train or transmission train becomes rather sophisticated and complex as it is the case for magnetic linear drive units that may use a plurality of different spring devices such as suspension springs and resonance springs which need sufficient space to allow for linear displacement of the drive components. To avoid magnetic creep or magnetic short-circuiting, the shielding plates need a sufficient distance from the magnetically interacting components of the drive unit, what further increases the space needed for the provision of such magnetic shielding surrounding the drive unit.

SUMMARY OF THE INVENTION

It is an objective underlying the present invention to provide for an improved electric appliance for personal care avoiding at least one of the disadvantages of the prior art and/or further developing the existing solutions. In particular, an improved, compact and space-saving magnetic shielding for preventing or at least reducing propagation of magnetic fields is desired.

A more particular objective underlying the invention is to provide for an improved drive unit with a simple structure that can be easily manufactured and mounted, but still achieves efficient magnetic shielding of the drive unit's magnetically interacting components.

Another objective is to avoid complicated mounting structures and to allow for efficient installation of the drive unit and the magnetic shielding into housing elements forming handpieces without requiring additional space or redesigning established ergonomic housings.

To achieve at least one of the aforementioned objectives, the magnetic shielding is integrated into a structural part of the drive support and/or of the drive train at least partially surrounding the magnetically interacting components of the drive unit, thereby giving such structural part a double function including magnetic shielding on the one hand and supporting/suspension of the drive unit or transmission of driving movements on the other hand what helps in avoiding additional space for the magnetic shield. In particular, such structural part of the drive train or of the drive unit support may be configured to form a shield against magnetic fields emitted by the magnetically interacting drive components, thus avoiding additional parts and making use of structural parts needed as such for other reasons than magnetic shielding.

According to an aspect, the magnetic shielding is formed at least partially by a structural part of said drive support and/or of said drive train which structural part is made of a soft magnetic material and is configured to surround the drive unit at multiple sides thereof.

These and other advantages become more apparent from the following description giving reference to the drawings and possible examples.

BRIEF DESCRIPTION OF THE DRAWINGS

FIG. 5(a): an exploded, perspective view of the mounting frame of the drive unit shown in FIG. 4.

FIG. 5(b): an exploded view of and the drive transmission frame of the drive unit shown in FIG. 4 for use with the mounting frame shown in FIG. 5(a). said mounting frame and transmission frame forming a pair of magnetic shielding frames surrounding the magnetically interacting components of the drive unit about loop axes transverse to each other.

DETAILED DESCRIPTION OF THE INVENTION

Figure 1:
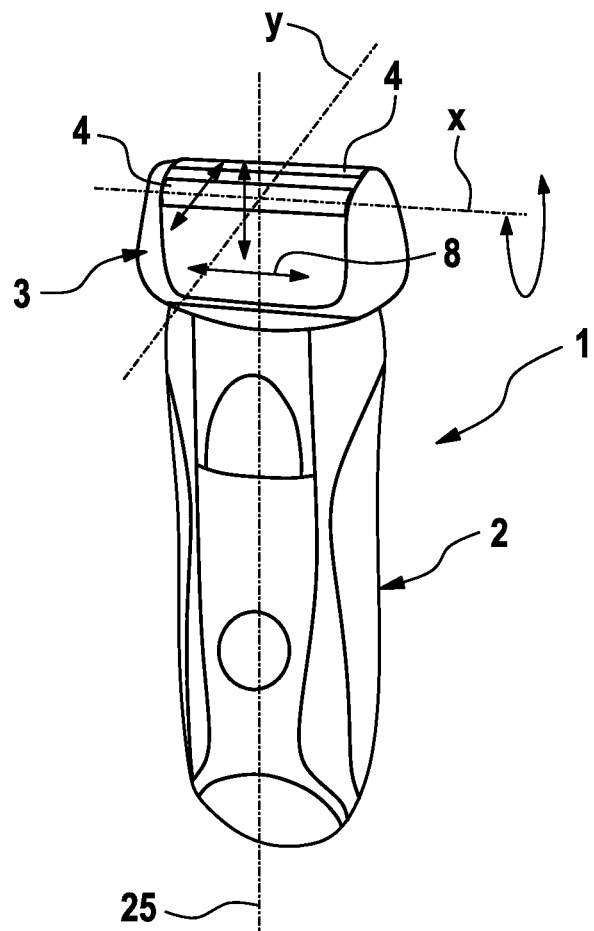
FIG. 1: is a perspective partial view of a small-sized electric appliance for personal care in terms of an electric shaver having a shaver head including two cutter elements drivable in an oscillating manner by a linear type drive unit received within the shaver housing forming the shaver's handpiece.

In order to achieve an efficient magnetic shielding without needing additional space for accommodating the drive unit, it is suggested that the magnetic shielding at least partially surrounding the drive unit is formed at least partially by a structural part of the drive support and/or a structural part of the drive train, which structural part is made of a material with a magnetic permeability μr>10 and/or a soft magnetic material, and configured to surround the drive unit on two or more sides thereof.

Such structural part forming a magnetic shield may be configured to connect the drive unit to a housing or structural part of the electric appliance, thereby supporting or suspending the drive unit. In the alternative or in addition, a structural part of the drive train forming a magnetic shield may be configured to transmit a driving movement and/or a driving oscillation of the drive unit to a working tool of the electrical appliance. In addition to its natural function of supporting or suspending the drive unit and/or transmitting driving movements, the structural part is configured to act as a magnetic shielding at least partially surrounding the magnetically interacting drive components and preventing or at least reducing propagation of magnetic fields originating from said magnetically interacting drive components.

In order to efficiently prevent or at least reduce the propagation of magnetic fields, said magnetic shielding and/or the aforementioned structural part forming the magnetic shielding may form at least one frame surrounding the drive unit substantially at four, five or all sides thereof, wherein such frame is advantageously made of a soft magnetic metal or another metal or material with a magnetic permeability μr>10. In order to catch up magnetic fields more efficiently, said frame may be configured to form a closed loop frame providing for a continuous, closed loop path made of soft magnetic metal without interruptions such as slots or gaps interrupting the magnetically effective path of the frame.

Such magnetically shielding loop frame may be completely closed so that the magnetic field may run around said loop without bridging over gaps, interruptions etc. However, it may be sufficient when such magnetically shielding loop is substantially closed. For example, if the frame is assembled from multiple parts, such frame parts may be connected to each other by means of gluing or adhesion so there is a tiny adhesive bridge between the metal parts. Similarly, when the frame is formed to a loop by means of bending a strip of material the ends of which are glued together, there is also a tiny gap filled by adhesive. Nevertheless, such loop frame may be considered to be a substantially closed loop. Furthermore, the loop frame also may include recesses such as windows or a frame structure built around recesses what still may provide for a closed loop structure where the magnetic field may run through the material in a closed loop as such windows or recesses may be passed by the magnetic field going through the surrounding frame structure. Similarly, frame structures comprising a plurality of frame parts press-fitted to each other may be considered as a substantially closed loop although there is no homogeneous material distribution at the press-fitted contact surfaces. Nevertheless press-fitted contact surfaces may allow the magnetic field to travel along the loop provided by the frame structure and traverse said press-fitted contact surfaces.

More particularly, a pair of magnetic shielding frames may be provided and configured to surround the drive unit about a pair of loop axes extending substantially perpendicular or transverse to each other. Thus, by means of such pair of magnetic shielding frames providing for a pair of closed loops extending in different directions, propagation of magnetic fields may be prevented in substantially all possible six directions of magnetic field propagation into the ambient space neighboring the drive unit.

According to an advantageous aspect, structural parts of the drive support and the drive train form a magnetic shielding cage surrounding the magnetically interacting components of the drive unit, wherein such structural parts of said shielding cage are movable relative to each other. Said magnetic shielding cage includes at least two shielding parts which are movable relative to each other and may surround the drive components of the drive unit on six sides thereof. More particularly, a mounting frame and a transmitter frame movable relative to said mounting frame, together form said magnetic shielding cage.

More particularly, a first one of said pair of magnetic shielding frames may be formed by a mounting frame which is a part of the drive support and which may be connected, on the one hand, to the drive unit and, on the other hand, to a housing of the appliance or another structural part forming the device's ambience around the drive unit such as, for example, a shaver head when the drive unit is mounted in the shaver head. More particularly, said mounting frame forming the first magnetic shielding frame may be connected to the drive unit by means of a spring device movably supporting the drive unit onto said mounting frame, wherein said mounting frame may include mounting portions such as screw-hole bosses or press-fitting noses to be mounted to a housing or said structural part of the electric appliance.

Such first magnetic shielding frame formed by said mounting frame of the drive support may form a closed loop about a loop axis which may extend perpendicular or transverse to the linear oscillation axis of the drive components of the drive unit. In other words, the first magnetic shielding frame formed by the mounting frame may extend in or substantially parallel to a plane containing the linear displacement axis and the oscillation axis of the working tools. For example, when the drive components oscillate from left to right, said first magnetic shielding frame formed by the mounting structure may extend along right and left sides and top and bottom sides of the drive unit.

A second one of said pair of magnetic shielding frames may be formed by a transmission frame which is a part of the drive train for transmitting oscillations or driving movements of one of the drive components of the drive unit to a working tool of the appliance. More particularly, said transmission frame forming a magnetic shielding frame may be connected to a movable drive component of said drive unit in a substantially rigid manner and, on the other hand, may be connected to a drive pin for driving the working tool or another drive train element to which the working tool is connected.

Said second magnetic shielding frame may form a closed loop about a second loop axis extending substantially parallel to the linear displacement axis of the drive unit. In other words, the second magnetic shielding frame formed by the transmitter frame may extend in or substantially parallel to a plane extending transverse to the linear displacement axis of the drive components.

So as to achieve structural rigidity sufficient for the transmitting and/or supporting function of the structural part and, at the same time, efficient magnetic shielding, the structural parts forming the magnetic shielding may be made of a sheet-like or plate-like material such as a metal sheet.

Thus, the structural parts forming the magnetic shielding may have a plate-like shape, wherein one of the main axes defining such plate-like shape may extend substantially parallel to the loop axis about which the structural part forms a closed loop. Thus, a sleeve-like frame surrounding the drive unit like a frame may be formed by said structural part made of sheet material.

More particularly, such magnetic shielding frame formed by the structural part made of sheet material may define a substantially cylindrical body with a cylinder axis extending substantially parallel to the loop axis. To avoid misunderstandings, it should be noted that such cylindrical configuration may have, but does not need to have a circular base contour. For example, the cylinder may have a rectangular or polygonal base contour, thus forming a straight prism with rectangular or polygonal cross-section.

More particularly, the plate-like sheet material forming the structural part of the drive support and/or of the transmitter may extend substantially perpendicular to a plane extending through the gap between the two magnetically interacting components. At least around said gap between the magnetically interacting components, the magnetic shielding may extend substantially perpendicular to straight lines going through said gap.

The structural parts forming the magnetic shielding may be made of a soft magnetic steel or another magnetically shielding material chosen to have a magnetic permeability $\mu r > 10$ or $\mu r > 100$ or $\mu r > 1000$, wherein such magnetic permeability can be the relative permeability.

More particularly, the structural parts forming the magnetic shielding may be made of ferritic steel and/or martensitic steel. Basically, austenitic steel could be used, but provides for a less magnetic effect.

More particularly, electrolytic zinc-coated steels may be used, wherein the structural parts forming the magnetic shielding may be made from electrolytic zinc-coated steel sheets, wherein such steel sheets may be cold-rolled or -drawn.

In order to achieve a sufficiently rigid and stiff drive unit structure that can be easily manufactured and mounted within the restricted space of a personal appliance's housing, it is suggested a first spring device movably connecting the two drive components of the drive unit to each other includes one or more spring elements made from plastics, whereas a second spring device movably linking the drive unit to a structural component of the appliance includes one or more spring elements made from metal.

The first spring device made of plastics may include mounting structures for easily connecting the first and second drive components to the one or more spring elements made of plastics, thereby allowing for easy mounting. The second spring device including at least one metal spring element provides for sufficient rigidity and stiffness of the drive unit structure, thereby achieving efficient transmission of oscillation with stable amplitudes and desired frequencies.

Said first spring device may form a resonance spring allowing and helping the two drive components of the drive unit to oscillate at a natural frequency. More particularly, said first spring device may connect a magnetic coil device forming a first drive component to a permanent magnet device forming the second drive component to each other in a way movable relative to each other in a basically linear way. Said second spring device may form a suspension spring device connecting said first or second drive component of the drive unit or another component of the drive unit to a mounting structure which mounting structure may be fixed to the appliance's housing or may be directly formed by the appliance's housing. Such suspension spring device formed by the second spring device may allow the entire drive unit to move relative to the mounting structure supporting the drive unit, wherein such mounting structure may be rigidly attached to or formed by the appliance's handle which may be formed by, for example, the shaver's housing or rigidly attached to or formed by the appliance's tool head.

The spring elements of the first and second spring devices may be formed as leaf springs which may extend along opposite sides of the drive unit and/or opposite sides of the first and second drive components thereof. More particularly, each spring element of both the first and second spring devices may consist of such leaf spring having an elongated, flattened, plate-like contour with a longitudinal axis extending substantially perpendicular or crosswise to the linear axis of movement of the drive unit.

More particularly, the leaf spring elements of the first and second spring devices may extend substantially parallel to each other along opposite sides of the drive unit, at least when the drive components of the drive unit are in a neutral, non-operative position.

The electric appliance for personal care may be an electric shaver including a handpiece formed by a shaver housing and a shaver head pivotably supported onto said handpiece about one or more pivot axes allowing for self-adaption of the shaver head to the contour of the skin to be shaved.

The shaver head may include only one cutter element, but the shaver head also may include two, three or more cutter elements. The shaver head may include further cutting or non-cutting functional elements such as a thermal element for cooling or heating a skin portion to be shaved, or a long-hair cutter, or fluid applicators to apply fluids such as deodorants, balms or lubricants onto the skin.

The transmission train for transmitting the drive power and movements of the electric linear motor to the at least one cutter element may have varying architectures and structures depending on the type of motor and the arrangement thereof. For example, the drive unit may include a reciprocating pin coupled to the aforementioned cutter element or undercutter directly or via an oscillation bridge allowing for pivoting of the cutter element relative to the angular orientation of the longitudinal axis of said pin.

These and other features become more apparent from the example shown in the drawings.

As can be seen from FIG. 1, shaver 1 may have a shaver housing 2 forming a handpiece for holding the shaver, which shaver housing 2 may have different shapes such as— roughly speaking—a substantially cylindrical shape or box shape or bone shape allowing for ergonomically grabbing and holding the shaver, wherein such shaver housing has a longitudinal shaver housing axis 25 due to the elongated shape of such housing, cf. FIG. 1.

On one end of the shaver housing 2, a shaver head 3 is attached to the shaver housing 2, wherein the shaver head 3 can be pivotably supported about a shaver head pivot axis x extending substantially perpendicular to the aforementioned longitudinal shaver housing axis and/or about an axis y perpendicular to said axis x. The shaver housing 2 may have a pair of support arms projecting from the shaver head end of the shaver housing 2 between which support arms a carrier structure of the shaver head 3, for example in terms of a shaver head frame, can be pivotably mounted about said shaver head pivot axis x.

As can be seen from FIG. 1, the shaver head 3 may include a pair of cutter elements 4, wherein only one or three or more of such cutter elements 4 may be provided. Such cutter elements 4 may form block-like undercutters with a plurality of shearing blades cooperating with a shear foil covering the respective cutter elements 4. The said cutter elements 4 may have an elongated shape with a longitudinal axis extending substantially parallel to the aforementioned shaver head pivot axis and/or substantially parallel to the cutting oscillation axis 8 along which the cutter elements 4 are driven in an oscillating manner.

Figure 2:
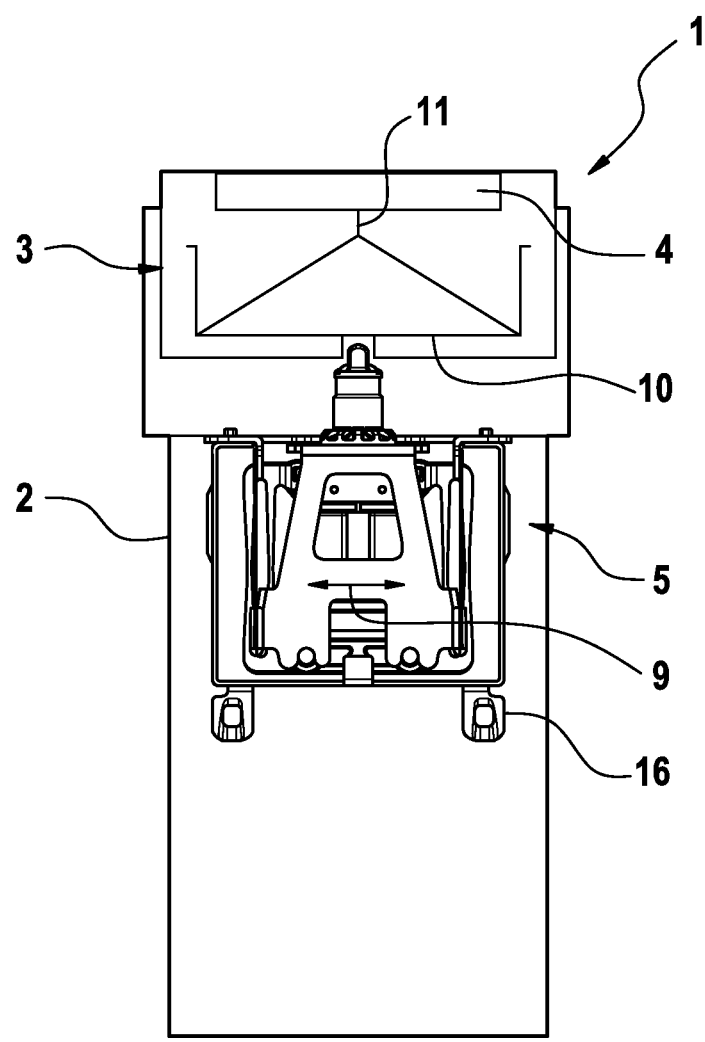
FIG. 2: is a plane view of a drive unit including magnetic-type drive components supported for linear oscillation and the surrounding mounting structure of the electric appliance of FIG. 1, FIG. 3: is a plane view of the drive unit of FIG. 2, showing a first spring device connecting the two magnetic drive components of the drive unit to each other and a second spring device connecting the drive unit to a mounting structure of the electric appliance.

As can be seen from FIG. 2, the drive unit 5 which may be received within the shaver housing 2 to drive the cutter elements 4 at the shaver head 3, may be of the linear oscillating type and may include a first drive component 6 and a second drive component 7 which may oscillate relative to each other along an oscillation axis 9. Said first drive component 6 may form an active drive component coupled to the aforementioned cutter elements 4 by means of a transmitter 10 which may include a transmitter pin 11 extending from the drive unit 5 towards the shaver head 3. Such transmitter pin 11 may be directly coupled to the cutter elements 4, for example by means of a pivot bearing allowing for an additional transverse degree of freedom to compensate for pivoting of the shaver head 3. In the alternative, the transmitter 10 may include further transmission components such as a transmission bridge as it is per se known in the art.

Figure 3:
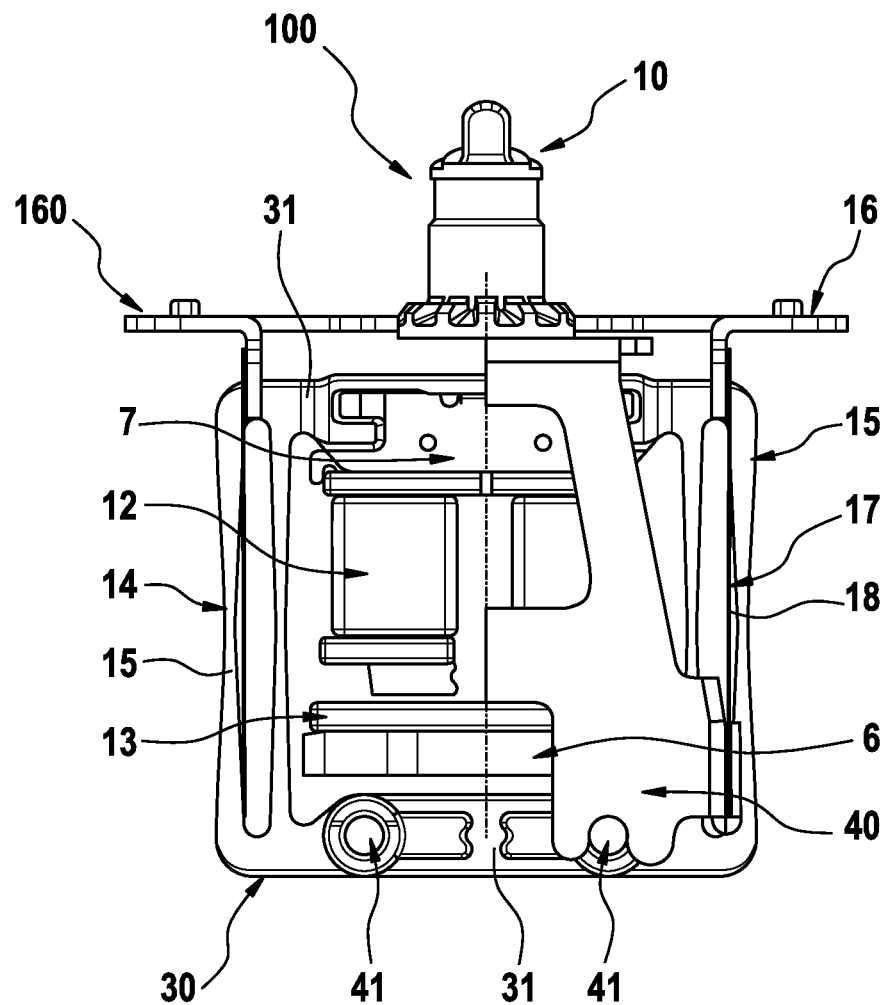

As shown by FIG. 3, said second drive component 7 may include one or more oscillating, magnetic coils 12, whereas the first drive component 6 may include one or more permanent magnets 13, wherein, however, an opposite arrangement may be chosen with the coils 12 associated with the first drive component 6 and the permanent magnets 13 associated with the second drive component 7.

Said first and second drive components 6 and 7 may be supported movably relative to each other by means of a first spring device 14 allowing movements of the first and second drive components 6 and 7 along the drive unit's 5 oscillation axis 9 extending substantially parallel to the cutter oscillation axis 8. Said movements of the first and second drive components 6 and 7 relative to each other along the oscillation axis 9 can be considered as linear movement.

Said first spring device 14 may include one or more resonance springs arranged between the first and second drive components 6 and 7 to promote oscillation of the first and second drive components 6 and 7 relative to each other at natural frequency.

More particularly, said resonance springs of the first spring device 14 may be formed by one or more leaf springs 15 extending with their longitudinal axis substantially perpendicular to the aforementioned oscillation axis 9 of the drive unit and connecting the first and second drive components 6 and 7 to each other. More particularly, at least one pair of such leaf springs 15 may extend on opposite sides of said first and second drive components 6 and 7, wherein said leaf springs 15, at one end, are connected to the first drive component 6 and, at the opposite end, are connected to the second drive component 7.

The leaf springs 15 may bend to allow linear oscillation of the drive components 6 and 7 relative to each other. Thus, both drive components 6 and 7 may execute linear oscillation, wherein such oscillation is effected in a sort of reverse motion. When the first drive component 6 moves to the left, the second drive component 7 moves to the right and vice versa.

More particularly, as shown by FIG. 3, the first spring device 14 and the leaf springs 15 thereof may be formed by a ring-shaped spring element 30, wherein said leaf springs 15 form a pair of legs of such ring element 30 on opposite sides thereof. Said ring element 30 further may include a pair of cross-bars or cross elements 31 extending substantially perpendicular to the longitudinal axis of the leaf springs 15 and connecting said leaf springs 15 to each other. As can be seen from FIG. 3, said ring element 30 may have a substantially rectangular contour formed by a pair of cross-bars 31 spaced from each other and said leaf springs 15.

Said cross-bars 31 may be provided with a mounting structure and/or mounting contours 32 for mounting the drive components 6 and 7 thereto. Such mounting contours 32 may be adapted to mounting contours of said drive components 6 and 7 to snugly fit therewith and/or to achieve form-fitting of the cross-bars 31 with the drive components 6 and 7.

Basically, the drive components 6 and 7 could be fixed to said cross-bars 31 by means of other fixation means such as bolts, screws, rivets or adhesives. To reduce the number or parts and the mounting steps, the drive components 6 and 7 can be rigidly fixed to the cross-bars 31 of the spring ring element 30 by means of the aforementioned complementary press-fitting contours.

Said ring-shaped first spring device 14 including the cross-bars 31 and the leaf springs 15 may be formed from plastic as a one-piece element without inhomogeneities such as welding seams or adhesion irregularities. In particular, the entire first spring device 14 may be formed from long-chained PPS.

In addition to such first spring device 14, a second spring device 17 may be provided for movably linking one of the first and second drive components 6 and 7 or another part of the drive unit 5 to a further structural part of the electric appliance, wherein such second spring device 17 may include a pair of leaf springs 18 that may form suspension springs for suspending the drive unit 5. More particularly, the drive unit 5 may be supported onto a mounting structure or mounting frame 16 by means of said second spring device 17.

Said mounting frame 16 may be a frame structure surrounding the drive unit 5, wherein such mounting frame may form a closed loop or ring or rectangular sleeve surrounding the drive unit 5. Said mounting structure 16 may be rigidly fixed to the shaver housing 2, for example by means of mounting flanges 16f, or may be held in the shaver housing 2 in a fixed position by means of suitable fixation means such as screws or latching means.

Said mounting frame 16 partially forms a magnetic shielding 200 for preventing or at least reducing propagation of magnetic fields originating from the magnetical interaction of the drive components 6 and 7. As can be seen from FIG. 5(a), said mounting frame 16 forms a closed loop about a loop axis 201, wherein such mounting frame 16 is made of a soft magnetic material such as a ferritic or martensitic steel, in particular an electrolytic zinc-coated steel. The mounting frame 16 forms an integral structure which may be a one-piece structure or a multiple-piece structure. When the mounting frame 16 is composed of more than one part, the parts are fixedly connected to each other with a contact area between the parts sufficiently large to ensure a magnetically closed loop.

As can be seen from FIG. 5(a), the mounting frame 16 can be made of a sheet material such as a cold-rolled or -drawn metal sheet.

The plate-like contours of the mounting frame 16 may be oriented substantially parallel to the aforementioned loop axis 201, thus forming a sleeve or a sort of rectangular cylinder or prism.

Figure 4:
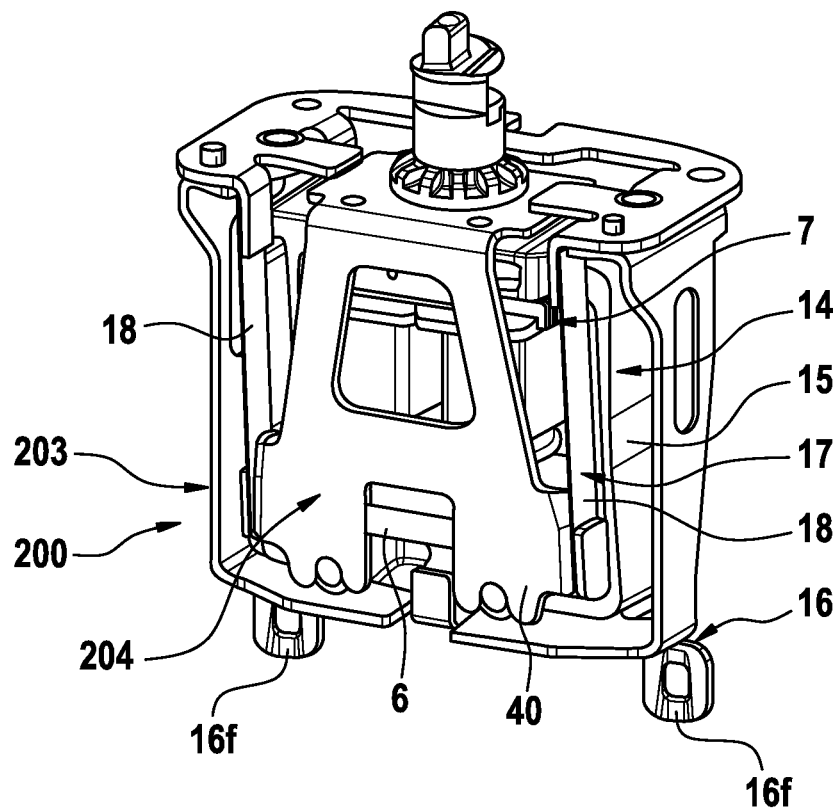
FIG. 4: a perspective view of the drive unit of FIG. 3, showing the first and second spring devices.

As can be seen from FIGS. 3, 4 and 5, the mounting frame 16 may surround the driving components 6 and 7 on left and right sides thereof and top and bottom sides thereof when viewing onto the drive components 6 and 7 in a direction perpendicular to the linear oscillation axis. In other words, when the drive components 6 and 7 oscillate from left to right and vice versa, the mounting frame 16 may surround said driving components 6 and 7 on left and right sides and top and bottom sides thereof.

Another part of the magnetic shielding 200 is formed by the transmitter 10 which may include a transmitter frame forming a closed loop about a loop axis 202 which may extend substantially parallel to the oscillation axis of the driving components 6 and 7. In other words, the magnetic shielding frame formed by the transmitter frame 204 may extend substantially transverse to the closed loop formed by the other magnetic shielding frame 203 formed by the mounting frame 16.

As can be seen from FIG. 5(b), said transmitter frame 204 forming a part of the magnetic shielding 200 may be formed from a sheet-like material, in particular sheet metal such as a cold-rolled or -drawn electrolytic zinc-coated steel sheet.

The transmitter frame 204 may comprise a plurality of frame legs rigidly connected to each other with a sufficiently large contact area between the legs to achieve a magnetically closed loop. More particularly, three legs or frame portions may be formed from an integral one-piece, U-shaped structure, wherein the ends of the parallel legs of said U body may be connected to each other by another frame leg which may be rigidly connected to the other frame legs by means of connection pins, cf. FIG. 5(b), thus forming a closed, sleeve-like frame.

Said transmitter frame 204 surrounds the driving components 6 and 7, wherein, for example, one of said driving components such as the permanent magnet may be rigidly fixed to said transmitter frame 204. As shown by FIG. 5(b), the transmitter frame 204 may include a metal plate forming the bottom leg 204b onto which the permanent magnet of the drive component 6 may be fixed.

Such bottom leg or portion of the transmitter frame 204 onto which the drive component 6 is mounted, may have a larger surface area than said drive component 6 so that the entire drive component 6 is shielded at its bottom side by said frame leg.

The transmitter frame 204 and the mounting frame 16 together form a magnetic shielding cage surrounding the magnetically interacting drive components 6 and 7 on six sides thereof. As said transmitter frame 204 is movable relative to the mounting frame 16, the magnetic shielding cage is formed by structural parts movable relative to each other.

The shaver head 3 may include further functional elements such as a long-hair cutter which may be arranged between the aforementioned pair of cutter elements 4.

The cutter elements 4 can be driven in an oscillating manner along cutting oscillation axis 8. In addition to such cutting movements, the cutting elements 4 can be pivotable and movable in directions transverse to said cutting oscillation axis 8.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An electric shaver for personal care comprising a magnetic linear drive unit having first and second drive components adapted to magnetically interact with each other to oscillate relative to each other in a substantially linear manner, a drive train connecting said first drive component to a working tool, a drive support for supporting said drive unit to a housing and being rigidly fixed to the housing so as to be in a fixed position relative to the housing, and a magnetic shielding at least partially surrounding the drive unit, wherein said magnetic shielding is formed at least partially by a structural part of said drive train which structural part is made of a material with a magnetic permeability of about $\mu r > 10$ and configured to surround the drive unit at sides thereof, said structural part of said drive train is movable relative to said drive support, wherein said magnetic shielding is formed at least partially also by a structural part of said drive support, said structural part of said drive train forming the magnetic shielding forms a first magnetic shielding frame, said structural part of said drive support also forming the magnetic shielding forms a second magnetic shielding frame, and said first and second magnetic shielding frames together form a magnetic shielding cage, wherein said first and second magnetic shielding frames together form the magnetic shielding cage surrounding the magnetically interacting drive components of the drive unit on six sides thereof.

2. The electric shaver according to claim 1, wherein said magnetic shielding is formed by a soft magnetic material.

3. The electric shaver according to claim 1, wherein said structural part of said drive support forming the magnetic shielding is configured to connect said drive unit to said housing.

4. The electric shaver according to claim 1, wherein said structural part of said drive train forming the magnetic shielding is configured to transmit a driving movement.

5. The electric shaver according to claim 1, wherein said structural part of the drive support and the structural part of the drive train are made from a metal sheet.

6. The electric shaver according to claim 1, wherein said structural part of said drive train forming the magnetic shielding forms the first magnetic shielding frame surrounding the drive unit on four or more sides thereof and made of a soft magnetic metal and a metal with a magnetic permeability of about $\mu r > 10$.

7. The electric shaver according to claim 6, wherein said first magnetic shielding frame forms a substantially closed loop made of soft magnetic material.

8. An electric appliance for personal care comprising a magnetic linear drive unit having first and second drive components adapted to magnetically interact with each other to oscillate relative to each other in a substantially linear manner, a drive train connecting said first drive component to a working tool, a drive support for supporting said drive unit to a housing or a structural element of the electric appliance, and a magnetic shielding at least partially surrounding the drive unit, wherein said magnetic shielding is formed at least partially by a structural part of said drive train which structural part is made of a material with a magnetic permeability of about $\mu r > 10$ and configured to surround the drive unit at sides thereof, said structural part of said drive train is movable relative to said drive support, wherein said structural part of said drive train forming the magnetic shielding forms a magnetic shielding frame surrounding the drive unit on four or more sides thereof and made of a soft magnetic metal and a metal with a magnetic permeability of about $\mu r > 10$, wherein a pair of magnetic shielding frames is provided, one being defined by said structural part of said drive train, said pair of magnetic shielding frames surrounding the drive unit in a pair of loops about loop axes extending transverse to each other.

9. The electric appliance according to claim 8, wherein each of said pair of magnetic shielding frames is made of a sheet-like material having a main axis oriented substantially parallel to the corresponding loop axis, thereby forming a sleeve-like body with peripheral walls substantially parallel to a respective one of said loop axes.

10. The electric appliance according to claim 8, wherein said pair of magnetic shielding frames together form a magnetic shielding cage surrounding the magnetically interacting drive components of the drive unit on six sides thereof, wherein said magnetically shielding cage includes portions movable relative to each other, which portions are formed by said pair of shielding frames.

11. The electric shaver according to claim 1, wherein said structural part of said drive support comprises a mounting frame and said magnetic shielding comprising the second magnetic shielding frame being formed by the mounting frame which is connected to said drive unit by a spring device movably supporting said drive unit onto said mounting frame, said mounting frame including mounting portions to be mounted to said housing.

12. The electric shaver according to claim 1, wherein said structural part of said drive train comprises a transmitter frame and said magnetic shielding comprising the first magnetic shielding frame being formed by the transmitter frame which is fixedly connected to one of said movable drive components of said drive unit and connected to a drive pin for driving the working tool.

13. The electric appliance according to claim 9, wherein said pair of magnetic shielding frames together form a magnetic shielding cage surrounding the magnetically interacting drive components of the drive unit on six sides thereof, said magnetically shielding cage including portions movable relative to each other and formed by said pair of magnetic shielding frames.

14. An electric appliance for personal care comprising a magnetic linear drive unit having first and second drive components adapted to magnetically interact with each other to oscillate relative to each other in a substantially linear manner, a drive train connecting said first drive component to a working tool, a drive support for supporting said drive unit to a housing or a structural element of the electric appliance, and a magnetic shielding at least partially surrounding the drive unit, wherein said magnetic shielding is formed at least partially by a structural part of said drive train which structural part is made of a material with a magnetic permeability of about µr>10 and configured to surround the drive unit at sides thereof, said structural part of said drive train is movable relative to said drive support, wherein said drive train comprises a transmitter frame and said magnetic shielding further comprises a magnetic shielding frame formed by the transmitter frame which is fixedly connected to a movable drive component of said drive unit and connected to a drive pin for driving the working tool, wherein said transmitter frame includes a plate-like shield portion extending in front of a gap between the two drive components and entirely covers said gap between said two drive components, said plate-like shield portion extending substantially parallel to an oscillation axis of said drive components and transverse to a plane through said gap.

15. The electric shaver according to claim 1, wherein said structural part of the drive train is made of a soft magnetic material having a relative magnetic permeability of about µr>10.

16. The electric shaver according to claim 1, wherein the magnetic shielding is made of a ferritic or a martensitic steel.

17. The electric shaver according to claim 1, wherein the magnetic shielding is made of an electrolytic zinc-coated steel sheet.

* * * * *